(12) United States Patent
Grundmann et al.

(10) Patent No.: US 11,416,570 B2
(45) Date of Patent: Aug. 16, 2022

(54) SYSTEM AND METHOD FOR PROCESS-RELATED GENERATION OF AGRICULTURAL DATA

(71) Applicant: 365FarmNet Group KGaA mbH & Co. KG, Harsewinkel (DE)

(72) Inventors: Marten Grundmann, Berlin (DE); Stephan Poppe-Kirchmann, Lüdinghausen (DE)

(73) Assignee: 365FarmNet Group KGaA mbH & Co. KG, Harsewinkel (DE)

( * ) Notice: Subject to any disclaimer, the term of this patent is extended or adjusted under 35 U.S.C. 154(b) by 0 days.

(21) Appl. No.: 17/159,624

(22) Filed: Jan. 27, 2021

(65) Prior Publication Data
US 2021/0232648 A1    Jul. 29, 2021

(30) Foreign Application Priority Data
Jan. 29, 2020    (DE) .......................... 102020102148.8

(51) Int. Cl.
| | | |
|---|---|---|
| *G06F 16/9535* | (2019.01) | |
| *G06F 16/9537* | (2019.01) | |
| *G06Q 10/06* | (2012.01) | |
| *G06Q 50/02* | (2012.01) | |

(52) U.S. Cl.
CPC ...... *G06F 16/9535* (2019.01); *G06F 16/9537* (2019.01); *G06Q 10/06313* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 2014/0195126 A1* | 7/2014 | Prickel ................. | A01B 71/02 701/50 |
| 2016/0073573 A1* | 3/2016 | Ethington ............. | G06Q 50/02 705/7.36 |
| 2020/0311828 A1* | 10/2020 | Schafer ............. | G06Q 30/0206 |

FOREIGN PATENT DOCUMENTS

WO    2018060818 A1    4/2018

OTHER PUBLICATIONS

European Search Report issued in related application No. EP20200688.8, dated Apr. 16, 2021 (8 pages).

* cited by examiner

*Primary Examiner* — Christopher J Raab
(74) *Attorney, Agent, or Firm* — Lempia Summerfield Katz LLC

(57) ABSTRACT

A method and a system for the process-related generation of agricultural data is disclosed. A server platform includes an input tool and a query tool, wherein the user uses the input tool to executes a process-related agricultural input routine, such as a documentation routine to document an agricultural process, or a planning routine for planning an agricultural process, and wherein the query tool is linked through IT to the input tool. The user provides agricultural process parameters in the input routine to the server platform. Further, the server platform includes data memory with query data comprising different lists of agricultural questions with boundary conditions associated therewith. The query tool compares the process parameters and the boundary conditions, and based on the comparison, the query tool selects a list of agricultural questions and queries the user about questions from the selected list.

20 Claims, 1 Drawing Sheet

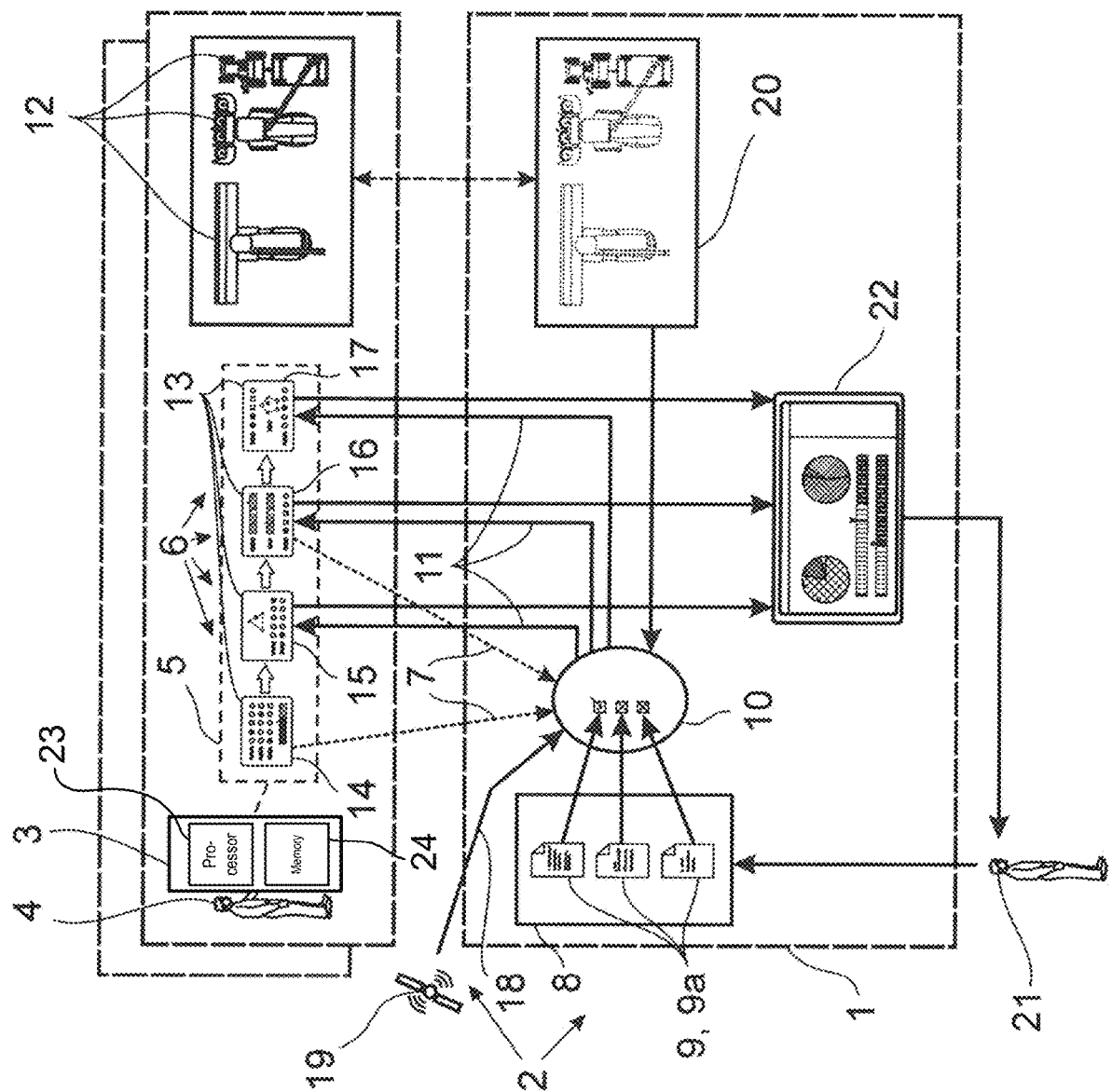

SYSTEM AND METHOD FOR PROCESS-RELATED GENERATION OF AGRICULTURAL DATA

CROSS REFERENCE TO RELATED APPLICATION

This application claims priority under 35 U.S.C. § 119 to German Patent Application No. DE 102020102148.8 (filed Jan. 29, 2020), the entire disclosure of which is hereby incorporated by reference herein.

TECHNICAL FIELD

The invention relates to a system and method for the process-related generation of agricultural data using a query tool of a server platform.

BACKGROUND

Generally speaking, agriculture seeks to optimize numerous processes with the support of data. As such, it may be useful for actors to consider the needs of other actors. In this way, the manufacturer or seller of fertilizers, seed, agricultural machinery or herbicides may then be able to specifically adapt its products and deliveries to the market. In order to do this efficiently, the manufacturer may seek data from the customers, particularly farmers. This data may relate to the reasons for, the type of, and frequency of using a product, and optionally other factors as well.

DESCRIPTION OF THE FIGURE

The present application is further described in the detailed description which follows, in reference to the noted plurality of drawings by way of non-limiting examples of exemplary implementation, in which like reference numerals represent similar parts throughout the several views of the drawings, and wherein:

FIG. 1 shows a schematic representation of a method for the process-related generation of agricultural data by a query tool of a server platform.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, data may be used in order to optimize numerous processes in agriculture. However, there is currently no option for reliably and efficiently collecting a large amount of such data. The standard for collecting such data are market research institutes, which collect data from farmers, generally at the end of an agricultural period. At this point in time, the farmer is however no longer aware of all of the relevant factors, resulting in the collected data being imprecise. In addition, the data collected at the end of the agricultural period is no longer current. In this regard, such collection of data does not precisely collect current, relevant and high-quality data.

In one or some embodiments, a system and method are disclosed for the process-related generation of agricultural data such that it is more tailored to the practical requirements in the agricultural sector.

In particular, much data in the relevant agricultural processes are already currently digitized. Generally, this digitization may occur in any one, in any combination, or all of before, during, or after performing the agricultural process. As one example, the digitization may occur in the form of a plan generated before performing the agricultural process. This digitization may, in particular, be exploited in order to also collect current and highly relevant other data. For example, a farmer may be asked the reason why he/she is planning to spread fertilizer while he/she is planning to spread fertilizer. Moreover, while documenting the spreading of fertilizer, the farmer may be asked about one or more other aspects that are still fresh in the farmer's memory at that time shortly after the fertilizer has been spread. As discussed in more detail below, the obtaining of the data, either in real-time or in near real-time, is coupled to the generation of the data (e.g., before, during, or after performing the agricultural process), thereby making the obtaining of the data easier and more reliable. In particular, since this querying may be integrated directly into an input routine that the farmer is already performing, this data may be generated with reasonable or less effort.

Thus, in one or some embodiments, a method is disclosed for the process-related generation of agricultural data using a query tool of a server platform, wherein the server platform has an input tool through which a user executes a process-related agricultural input routine, such as a documentation routine to document an agricultural process or a planning routine for planning an agricultural process, wherein the query tool is linked through informational technology (IT) to the input tool, wherein the user offers agricultural process parameters in the input routine to the server platform, wherein the server platform has a data memory with query data comprising at least one agricultural list of questions with boundary conditions associated therewith, wherein the query tool checks the process parameters and the boundary conditions for correspondence in a comparison routine, wherein in the event of a correspondence, the query tool selects the list of questions assigned to the correspondence and selects or generates at least one question from the selected list of questions, and wherein the query tool offers the user the at least one question in the input routine to be answered. As discussed in more detail below, boundary conditions may comprise any one, any combination, or all of the following: an upper limit; a lower limit; or a characteristic/trait (not associated with any upper limit or lower limit).

Conventional queries for generating such data normally begin with so-called screening questions. In this context, the user may generally first be asked whether he or she satisfies the relevant requirements for the query. In the present disclosed methodology, this may be unnecessary. Specifically, the boundary conditions may be directly compared automatically in the background so that the user is only presented the question when his/her answer to the question is also relevant. In other words, the methodology may determine, based on the boundary conditions (discussed below), whether to even present the desired questions to the user (rather than query the user with preliminary questions to determine whether to present the desired questions to obtain the data. This greatly minimizes the effort for the user.

Thus, the query tool (tasked with presented the desired questions) may be linked with an input tool of a server platform, where the input tool is already tasked with entering process-specific data, and in turn this link enables the query tool to be triggered to determine whether to collect current and specific data. In contrast, this ability to present questions to the user would simply be impossible with conventional market research since on one hand, the screening would produce too much overhead and on the other hand, not enough users could be presented with the relevant questions at the relevant time.

In one or some embodiments, the server platform includes one or more input tools with input routine(s). In such embodiments, relevant process parameters of the server platform are known on the one hand so that precise boundary conditions can be defined and checked, and on the other hand, highly valuable data can be generated from the questions. In this way, the input tool(s) with the input routine(s) may generate documentation for one or more aspects associated with agriculture, such as any one, any combination, or all of documentation regarding: agricultural fields; animals; plans for field work routes; field fertilization; milking processes; crop sequences; crop types; herbicide applications; or workloads on agricultural production machines.

In one or some embodiments, the process parameters and/or boundary conditions may produce high-quality data. In particular, the process parameters and/or the boundary conditions may relate to the use of an agricultural production machine and/or the use (e.g., the consumption) of the agricultural means of production (e.g., any one, any combination, or all of: a fertilizer; an herbicide; a feed; or a seed).

In one or some embodiments, the input routine may comprise processing an adaptive process questionnaire (e.g., based on any one, any combination, or all of process parameters, boundary conditions, answers to previous questions, the input routine may dynamically adapt the questions presented to the user). This adaptive process questionnaire may comprise one or more standard questions (e.g., predetermined questions) that may serve to document and/or plan the agricultural process. Depending on the answers by the user to the standard questions, the adaptive process questionnaire may then change in order to enable a targeted input of the process parameters. In this regard, one, some or all of the standard questions may be displayed to the user sequentially, with at least one of the standard questions being displayed by the input tool based on answers by the user to at least one of the preceding standard questions.

In particular within the context of this adaptive process questionnaire, the query tool can select or generate a question from the selected list of questions and offer or pose them to solicit input from the user or cause the question to be posed to the user in order to solicit input from the user (e.g., the query tool can cause the question to be output on a mobile device associated with the user and/or can cause the transmission (such as wireless transmission) of the question to another electronic device (such as a mobile device associated with the user or a computer associated with the agricultural machine of the user) in order for the another electronic device to output the question for soliciting input from the user. For example, at least one adaptive list of questions may be saved in memory, with the query tool selecting and/or generating at least one question from the adapted list of questions based on any one, any combination, or all of the following: the process parameters; the boundary conditions; at least one answer by the user to the standard questions of the process questionnaire; or at least one answer by the user to previous questions of the query tool (e.g., the selected list of questions).

In one or some embodiments, this question may be offered as part of the adaptive process questionnaire, whereby the user is barely inconvenienced in his/her work, thereby increasing the likelihood that the user will answer the question being posed. In particular, the input routine may comprise a first input step and a second input step, such as parts of the adaptive process questionnaire in which the user offers process parameters, with the query tool checking process parameters from the first input step and the boundary conditions for correspondence, and with the query tool accordingly offering the user the selected or generated question from the selected list of questions to be answered in the second input step.

In one or some embodiments, the query tool may select or generate other questions from the selected list of questions based on at least one already-answered question from the selected list of questions. Alternatively, or in addition, this may also be performed within the context of the adaptive process questionnaire. For example, the query tool may offer the user the selected or generated question from the selected list of questions to be answered in an input step of the input routine and, based on an answer from the user, selects or generates another question from the selected list of questions and offers this to the user to be answered in another input step.

In one or some embodiments, external parameters in addition to the process parameters may also be checked for correspondence with the boundary conditions. This may increase the precision of the selection by a user from a given list of questions. For example, the query tool may check external parameters from several users and the boundary conditions for a correspondence, with the query tool being linked by IT to the corresponding input tool to perform the comparison routine only when a correspondence exists between external parameters and the boundary conditions, and/or with the query tool executing the comparison routine in particular only when a correspondence exists between the boundary conditions of a list of questions and the external parameters.

In one or some embodiments, the external parameters may, for example, comprise localization data such as any one, any combination or all of: a specific region; weather data; or mapping data. In this regard, the server platform may receive the external parameters from an external data source, with the external parameters comprising localization data (e.g., GPS data), and/or weather data, and/or mapping data.

In one or some embodiments, the boundary conditions may comprise certain input routines. For example, an additional check is superfluous when a list of questions relates to livestock (e.g., the boundary condition is indicative of a livestock process), but the input routine relates to spreading fertilizer (e.g., the boundary condition is indicative of a fertilizing process). Thus, the boundary conditions of at least one list of questions may comprise an assignment of an input routine, and the query tool comparing the boundary conditions and the process parameters (e.g., the query tool compares whether the boundary condition(s) match the process parameter(s); if there is a match or a correspondence, the query tool selects a list of questions and presents the selected list of questions to the user).

In one or some embodiments, the query data may additionally or alternatively comprise screening data, which makes it possible, for example, to analyze the screening data in order to avoid further processing (e.g., the query tool may analyze the screening data to determine whether further processing, such as performing further comparison, such as comparing the boundary condition(s) with the process parameter(s), is necessary, thereby avoiding additional processing that may be more computationally expensive). Thus, at least one list of questions may also comprise screening data, and the query tool may then check the screening data and the particular user data assigned to the particular user for the existence of a screening correspondence, and the query tool may only execute the comparison routine, in particular when a screening correspondence exists (e.g., there is a match between screening data and the particular user data to indicate that further processing is warranted). In one or some embodiments, the screening data and the user data may comprise localization data (e.g., the screening data is GPS data, with the user's current GPS data being compared with the screening data; if the user's current GPS data matches the screening data (meaning that the user is geographically located in an area that indicates that further questioning is desired), further processing is performed).

In one or some embodiments, several users may perform input routines using the server platform. The greater number of users who use the server platform and its input routine, the higher-quality the generated data may be. Thus, a plurality of users, such as at least 10 users, at least 100 users, or at least 500 users, may execute input routines using the server platform.

In one or some embodiments, in order to motivate users to participate in the queries, the server platform may implement an automated bonus system. In this way, the user may be rewarded for answering the question.

In one or some embodiments, the list of questions may be defined by a user who offers the boundary conditions to the server platform, and who is provided responses from many users by the server platform. In particular, the user may define a list of questions, with the user offering the server platform the boundary conditions, in turn the server platform providing answers from a plurality of users to the user (such as aggregated answers).

In one or some embodiments, a server platform is also disclosed for performing the disclosed process.

Referring to the figures, FIG. 1 schematically shows the disclosed methodology for the process-related generation of agricultural data by a query tool 1 of a server platform 2. The server platform 2 may include one or more electronic devices, such as one or more servers and one or more mobile electronic devices. The various tools discussed herein may be embodied or incorporated into the one or more electronic devices. As merely one example, the query tool 1 may be incorporated into one or more servers sitting on the Internet and the input tool 5 may be incorporated into one or more electronic devices that are associated with an agricultural machine (e.g., a computer fixedly attached to the agricultural machine or a mobile computing device, such as a smartphone, that is temporarily associated with the agricultural machine). As another example, both the query tool 1 and the input tool 5 may be associated with the agricultural machine (e.g., both are resident in a computer fixedly attached to the agricultural machine or a mobile computing device, such as a smartphone, that is temporarily associated with the agricultural machine). In this regard, the server platform may comprise a server (such as a server sitting on the Internet), may comprise a server in combination with one or more electronic devices (such as a mobile electronic device, such as a mobile smartphone, and/or a fixedly attached electronic device, such as a computer fixedly attached to an agricultural machine), or may comprise one or more electronic devices with at least one of the electronic devices performing one or more server functions. As still another example, both the query tool 1 and the input tool 5 may be resident in one or more servers sitting on the Internet. Further, the various tools, including the query tool 1 and the input tool 5, may communicate in one of several ways. In the instance where the query tool 1 and the input tool 5 are resident in different devices, the query tool 1 and the input tool 5 may communicate via wired and/or wireless connections.

The term "process-related" means that the generated data have a reference (such as a direct reference) to an agricultural process. Such processes may relate to widely differing agricultural jobs or tasks, including without limitation, generally relating to animal husbandry or to field cultivation, or specifically relating to feeding a specific animal, or harvesting a specific plant. The term "generate" is directed to the collection of data and/or to the processing of the data. The server platform 2 may comprise one or more servers and one or more computer programs, and need not be restricted to a single location. The server platform 2 may comprise hardware component(s) that runs computer program(s). In principle, the server platform 2 may comprises computer 3 and/or a mobile device of a user 4. Accordingly, for example, part of the computer program of the server platform 2 may be installed on the computer 3. In principle, a decentralized embodiment of the server platform 2 is also contemplated. To communicate with the user 4, the server platform 2 comprises at least one input device and at least one output device, in this case the computer 3 of the user 4, or is connected thereto, at least temporarily.

Thus, the server platform 2 may be manifested in one or more computing devices, such as query tool 1 and/or computer 3. Further, server platform 2 may include one or more processors and one or more memories (for storing executable computer programs and/or data, such as in data memory 8). For purposes of illustration, computer 3 may include the one or more processors, such as processor 23, and the one or more memories, such as memory 24 (alternatively, or in addition, query tool 1 may include one or more processor and one or more memories; in this regard, any discussion regarding computer 3 may be equally applied to query tool 1). Though processor 23 (which may comprise a microprocessor, controller, PLA or the like) and memory 24 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry, such as processor 23, may store in or access instructions from memory 24 for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings. Thus, computer 3, using the processor 23 and the memory 24, may perform any one, any combination, or all of the funtionality discussed herein.

The server platform 2 includes an input tool 5 through which the user 4 performs a process-related agricultural input routine 6. The input routine 6 may be a documentation routine for documenting an agricultural process, or a planning routine for planning an agricultural process. In one or some embodiments, the input routine 6 may comprises a series of steps (or display screens), such as discussed further below. In the documentation routine, the user may, for example, document which fertilizer he/she has spread on which field. In the planning routine, the user may plan this spreading (e.g., beforehand), such as depending on the existing fertilizer.

In principle, the input routine 6 may also be integrated in an application-driven process, and therefore may relate to input during the processing of an agricultural process.

The query tool 1 may be linked, such as electronically linked or operationally linked, to the input tool 5. Various types of linking are contemplated, such as via informational technology (IT) or the like. Through such linkage, the query tool 1 is thereby given access to data from the input tool 5. In practice, the user 4 may offer or provide agricultural process parameters 7 to the input routine 6 of the server platform 2, which may then be at least partially (or entirely) forwarded to the query tool 1. In this regard, responsive to input of data via the input tool (such as immediately and in real-time responsive to input of data), the data may be forwarded to the query tool 1. Specifically, responsive to input of a certain type of data (discussed further below), the query tool 1 may be activated to engage the user 4 in order to obtain information, thereby minimizing real-time disruption while still obtaining the necessary information in real-time. These process parameters 7 may comprise various process-related data, which are explained below.

The server platform 2 includes a data memory 8 with query data comprising at least one agricultural list of questions 9 with boundary conditions 9a assigned thereto. In one or some embodiments, the boundary conditions 9a define those conditions under which the list of questions 9 are to be used. For example, in a list of questions 9 that relates to a certain herbicide, a boundary condition may be that the corresponding user 4 uses this herbicide. In this regard, various types of boundary conditions are contemplated, such as boundary conditions related to any one, any combination, or all of: a trait; an attribute; a quality (qualitative or quantitative); or the like.

The query tool 1 may compare the process parameters 7 with the boundary conditions 9a to determine a match (e.g., the query tool 1 checks the process parameters 7 and the boundary conditions 9a in a comparison routine 10 for correspondence or a match). This correspondence or match may be defined in various ways. A percent correspondence between the boundary conditions 9a and the process parameters 7 may, for example, be sufficient; it can however also be provided that certain boundary conditions 9a must be fulfilled (e.g., an exact match). It also contemplated that a pre-defined degree of correspondence or matching is determined, which is incorporated into the generated data. In this regard, various types of comparisons are contemplated.

When a correspondence or match exists, the query tool 1 selects the list of questions 9 assigned to the correspondence or the match; in FIG. 1, this for example is the upper list of questions 9. In one or some embodiments, different sets of questions may be available, with each of the different sets of questions have assigned boundary condition(s). Responsive to the query tool 1 determining that the process parameter(s) match (or most matches) the boundary condition(s) of one set of questions (selected from the different sets of questions), the query tool selects this one set of questions to present to the user. In this regard, the query tool 1 may then select or generate at least one question 11 from the selected list of questions 9. In FIG. 1, the transmission of some of the data, for example the process parameter 7 and the question 11, are schematically represented by arrows.

In this case and preferably, the list of questions 9 already contains one or more given questions 11 to be selected. Alternatively, or in addition, the questions 11 provided may be partially or completely generated, for example depending on the process parameters 7 (e.g., generated in real-time depending on the process parameters 7). The generation may relate to the content and/or the visual appearance of the question 11.

The query tool 1 offers to the user 4 the at least one question 11 to be answered in the input routine 6. For this purpose, the computer 3 may, for example, show or output the question 11 on a computer display. In one or some embodiments, the question 11 is shown to the user 4 during the processing of an agricultural process, for example while spreading fertilizer on a field. In this way, an action performed related to an agricultural process (such as in preparation for performing the agricultural process (e.g., inputting fertilizer parameters prior to beginning the spreading of fertilizer on the field), and/or during performing the agricultural process (e.g., while the fertilizer is being spread on the field), and/or immediately after performing the agricultural process (e.g., responsive to detecting the completion of spreading the fertilizer on the field)) may trigger the question 11 being shown to the user 4.

In FIG. 1, the query tool 1 is schematically differentiated from a region that identifies the surroundings of the user 4. It is also schematically shown that several users 4 can definitely be provided who, however, do not all have to be queried. The portrayed separation is however to be understood as illustrative and not restrictive.

The server platform 2 may primarily be used for various input tools 5 and only secondarily for the disclosed query tool 1. Accordingly, the server platform 2 may have a large user base that may be correspondingly queried. In this case, the server platform 2 has one or more input tools 5 with input routines 6 for documentation of any one, any combination, or all of: agricultural fields; animals; plans for field work routes; field fertilization; milking processes; crop sequences; crop types; herbicide applications, or workloads on agricultural production machines 12. The more varied the server platform 2, the more varied the generated data may be.

The process parameters 7 and/or the boundary conditions 9a may relate to the use of an agricultural production machine 12 and/or the use (e.g., the consumption) of an agricultural means of production (e.g., any one, any combination, or all of: a fertilizer; an herbicide; a feed; or a seed). This may, in turn, relate to the planning and/or documentation of use.

As shown in FIG. 1, the input routine 6 may comprise the processing of a process questionnaire 13. This process questionnaire 13 may, in particular, be an adaptive process questionnaire 13. The term "adaptive" in this case means that the process questionnaire 13 is not always identical, but rather may change based on one or more aspects, such as depending on preceding input (e.g., answers to preceding questions).

In one or some embodiments, the adaptive process questionnaire 13 comprises several standard questions that may serve to document and/or plan the agricultural process. These standard questions may serve to make it easier for the user 4 to input the relevant process parameters 7 and to convert them into a standardized format. Such a standard question may, for example, be the question about an amount of a fertilizer per hectare. However, highly complicated input masks with standard questions as input steps are also contemplated. One, some, or all of the standard questions may be displayed to the user 4 sequentially. In this case, at least one of the standard questions to be displayed is displayed by the input tool 5 based on answers by the user 4 to at least one of the preceding standard question(s).

In one or some embodiments, at least one adaptive list of questions 9 is saved in the data memory 8, or several adaptive lists of questions 9 are saved in the data memory 8. In turn, the query tool 1 may then select or generate at least one question 11 from the selected list of questions 9 based on any one, any combination, or all of: the process parameters 7; the boundary conditions 9a; at least one answer by the user 4 to the standard questions of the process questionnaire 13; or at least one answer of the user 4 to previous questions 11 of the query tool 1 (e.g., the selected list of questions 9). Accordingly, different query processes and questions 11 that depend on each other may also be depicted in the list of questions 9.

In one or some embodiments, to increase the likelihood that the user 4 will answer the question 11, the question 11 from the list of questions 9 may be visually the same as the standard questions and may be incorporated in this way in the process questionnaire 13. Alternatively, the question 11 in the list of questions 9 may be different in one or more aspects, such as visually highlighted in order to indicate to the user 4 that it is a question 11 from the query tool 1.

In one or some embodiments, the input routine 6 comprises a first and second input step 14, 15. These input steps 14, 15 may, as shown in FIG. 1, be parts of the adaptive process questionnaire 13. FIG. 1 depicts a total of four input steps 14, 15, 16, 17 (though fewer or greater numbers of steps are contemplated). The user 4 may offer or input process parameters 7 in the input steps 14, 15, 16, 17. In this case, the query tool 1 may check process parameters 7 from the first input step 14 and the boundary conditions 9a for correspondence and may offer the user 4 the selected or generated question 11 from the selected list of questions 9 to be answered in the second input step 15. Thus, the process parameters 7 that are input may be checked for certain values (which are indicative that further query input is to be generated), and responsive to process parameters 7 that are input matching one or more of the certain values, further query(ies) are triggered to the user 4. Given the stepwise answering of the process questionnaire 13, the query tool 1 may also receive the process parameters 7 in a stepwise or sequential manner and may therefore easily offer the user 4 the question 11 during the input routine 6.

In particular when the selected list of questions 9 is an adaptive list of questions 9, the query tool 1 may offer to the user 4 the selected or generated question 11 from the selected list of questions 9 to be answered in an input step 15, 16, 17 of the input routine 6 and, based on an answer from the user 4, may select or generate another question 11 from the selected list of questions 9 and offer or output this to the user 4 to be answered in another input step 16, 17. Accordingly, the processing of the input routine 6 and the querying by the query tool 1 may also be synchronized in this way with each other. This process may also be repeatedly extended over several input steps 15, 16, 17. Thus, in one embodiment, in a multi-step input process, the answer to one step in the multi-step input process may trigger the query tool 1 to generate additional questions to present to the user (an answer to step 14 may result in the query tool presenting questions to the user prior to proceeding to the next step 15 in the multi-step input process; in this way, the integration of the input tool 5 and the query tool 1 may be granular such that the query tool 1 may insert additional questions after any one, any combination, or all of the steps in the multi-step input process generated by the input tool 5). Of course, fewer or greater than the depicted four input steps 14, 15, 16, 17 are also contemplated.

Generally speaking, the server platform 2 may be used by several users 4, and the query tool 1 may also be queried by several of these users 4. In order to make a preselection, the query tool 1 may check external parameters 18 from several users 4 and may check the boundary conditions 9a for a correspondence (e.g., whether the boundary condition matches one or more predetermined values). In one or some embodiments, the query tool 1 is linked, such as electronically linked by IT, to the corresponding input tool 5 to perform the comparison routine 10 when a correspondence exists between external parameters 18 and the boundary conditions 9a. In particular, the query tool 1 may be linked by computer to the corresponding input tool 5 to perform the comparison routine 10 only when a correspondence exists between external parameters 18 and the boundary conditions 9a (e.g., the query tool 1 is activated responsive to identifying that the boundary conditions 9a match one or more of the external parameters 18). Accordingly, one or more of the users 4 to be queried may be selected beforehand. For example, a list of questions 9 may only be addressed to users 4 from a particular region, who are then correspondingly preselected. If a list of questions 9 corresponding to the user's particular region is then not available for a given user 4 (e.g., the users in the particular region are not required or sought to answer the list of questions 9), the user's input tool 5 does not have to be linked to the query tool 1 (e.g., responsive to identifying that the user is from the particular region where the answers to the list of questions 9 are not sought, the input tool 5 for the user is not linked to the query tool 1 so that the user is not presented with the list of questions 9).

In addition or alternatively, the query tool 1 may execute the comparison routine 10 when a correspondence or match exists between the boundary conditions 9a of a list of questions 9 and the external parameters 18. In particular, the query tool 1 may execute the comparison routine 10 when a correspondence or match exists between the boundary conditions 9a of a list of questions 9 and the external parameters 18. This preselection may also result in certain efficiencies. The term "linked" may refer to the functional connection between the input tool 5 and the query tool 1 and the fact that the query tool 1 may receive and use the process parameters 7.

In one or some embodiments, the server platform 2 receives the external parameters 18 from an external data source 19. In this case, this external data source 19 may be external to all users 4 and the server platform 2. The external data source 19 may, for example, be a weather satellite. In this case, the external parameters 18 comprise localization data, such as GPS data, and/or weather data, and/or mapping data.

The boundary conditions 9a of at least one list of questions 9 may, moreover, comprise an assignment of an input routine 6. Then, the list of questions 9 may only be used when the user 4 performs this input routine 6. Broadly, the query tool 1 may check the boundary conditions 9a and the process parameters 7 for correspondence or matching in the comparison routine 10 when the user 4 executes the input routine 6 assigned to the list of questions 9. In particular, the query tool 1 may only check the boundary conditions 9a and the process parameters 7 for correspondence or matching in the comparison routine 10 when the user 4 executes the input routine 6 assigned to the list of questions 9. As already mentioned above, focusing the times in which further processing is performed and/or in which the user is presented with questions (and where the questions are relevant to the current process) is more efficient. For example, it is more efficient not to present questions (or not to even execute the comparison routine) regarding field work when the process parameters 7 of an input routine 6 indicate that the current process is animal husbandry.

Likewise for preselection, at least one list of questions 9 can also comprise screening data. The query tool 1 may then check the screening data and the user data 20 assigned to the particular user 4 for the existence of a screening correspondence or matching. In this case, the user data 20 depicted in FIG. 1 are digital data known to the server platform 2 that may depict various properties of a user 4. In this case, the user data 20 may at least comprise data on the presence of agricultural production machines 12 and/or livestock, and/or crops, and/or crop types, etc.

Moreover, the screening data and the user data 20 may comprise localization data, such as GPS data. In this case, the query tool 1 may only execute the comparison routine 10 when a screening correspondence or match exists.

In this case, a plurality of users 4, such as at least 10 users 4, at least 100 users 4, such as more than at least 500 users 4, executes input routines 6 through the server platform 2.

In order to motivate as many possible users 4 to participate in the queries, it can be provided that the user 4 is rewarded for answering the question 11 through an automated bonus system of the server platform 2 in that the query tool triggers a rebate of 5 usage fees, for example.

In one or some embodiments, a list of questions 9 is defined by a user 21 who offers the boundary conditions 9a to the server platform 2. Accordingly, users 21 who would not have any access to the generated data without the server platform 2 are provided these data, and data can be generated for them. In this case, the server platform 2 may provide answers 22 from a plurality of users 4 to the user 21, such as in aggregated form.

According to another teaching, a server platform 2 per se may also be configured for use in a disclosed methodology. Reference is made to all statements regarding the disclosed methodology. In this case, the server platform 2 comprises at least one server and at least one computer program. The computer program as well may also be independently relevant. In this case, the server platform 2 has an input tool 5 through which the user 4 may perform a process-related agricultural input routine 6. Moreover, the server platform 2 may have a query tool 1.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Query tool
2 Server platform
3 Computer
4 User
5 Input tool
6 Input routine
7 Process parameters
8 Data memory
9 List of questions
9a Boundary conditions
10 Comparison routine
11 Question
12 Agricultural production machine
13 Process questionnaire
14 First input step
15 Second input step
16 Third input step
17 Fourth input step
18 External parameters
19 External data source
20 User data
21 User
22 Answers
23 Processor
24 Memory

The invention claimed is:

1. A method for a process-related generation of agricultural data by a query tool, the method comprising:

using one or more input tools of a server platform through which a user executes a process-related agricultural input routine, wherein a query tool is linked to the one or more input tools;

inputting, by the user via the input routine to the server platform, one or more agricultural process parameters for performing an agricultural process;

comparing, by the query tool, the one or more agricultural process parameters with one or more boundary conditions, wherein the server platform includes at least one memory with query data comprising at least one agricultural list of questions with the one or more boundary conditions associated therewith;

selecting, based on comparing the one or more agricultural process parameters with one or more boundary conditions, the at least one agricultural list of questions;

selecting at least one question from the at least one agricultural list of questions;

determining, based on analyzing at least one aspect of the agricultural process in real time, whether the agricultural process is being performed as the agricultural process is being performed or has been completed in real time upon completion; and responsive to determining in real time that the agricultural process is being performed or has been completed, soliciting input, via the query tool and in real time, by querying the at least one question in order for the user to answer the at least one question so that the user is presented with the at least one question while the agricultural process is being performed or responsive to completing the agricultural process.

2. The method of claim 1, wherein the one or more agricultural process parameters and the one or more boundary conditions relate to use of an agricultural production machine; and wherein responsive to the one or more agricultural process parameters matching the one or more boundary conditions:
the at least one agricultural list of questions is selected;
the at least one question from the at least one agricultural list of questions is selected; and
the user is queried with the at least one question.

3. The method of claim 1, wherein the one or more agricultural process parameters and the one or more boundary conditions relate to consumption of one or more of fertilizer, herbicide, feed, or seed; and wherein responsive to the one or more agricultural process parameters matching the one or more boundary conditions:
the at least one agricultural list of questions is selected;
the at least one question from the at least one agricultural list of questions is selected; and
the user is queried with the at least one question.

4. The method of claim 1, wherein the input routine includes processing an adaptive process questionnaire;

wherein the adaptive process questionnaire comprises one or more predetermined questions that document an agricultural process or plan the agricultural process; and wherein the one or more predetermined questions are displayed to the user sequentially, with at least one of the one or more predetermined questions being displayed by the one or more input tools based one or more answers provided by the user to a preceding one of the one or more predetermined questions.

5. The method of claim 4, wherein the query tool selects or generates at least one question from the at least one agricultural list of questions based on the one or more agricultural process parameters, the one or more boundary conditions, and at least one answer by the user to the one or more predetermined questions of the adaptive process questionnaire.

6. The method of claim 4, wherein the query tool selects or generates at least one question from the at least one agricultural list of questions based on the one or more agricultural process parameters, the one or more boundary conditions, and at least one answer by the user to one or more previous questions from the at least one agricultural list of questions.

7. The method of claim 4, wherein the input routine comprises a first input step and a second input step as parts of the adaptive process questionnaire in which the user provides the one or more agricultural process parameters;

wherein the query tool checks the one or more agricultural process parameters from the first input step with the one or more boundary conditions for a match; and wherein responsive to the query tool determining that there is the match of the one or more agricultural process parameters from the first input step with the one or more boundary conditions, the query tool offers the user the at least one question from the at least one agricultural list of questions to be answered in the second input step.

8. The method of claim 1, wherein the query tool compares one or more external parameters from a plurality of users and the one or more boundary conditions for a match; and wherein the query tool is linked to the one or more input tools to perform the comparison of the one or more agricultural process parameters with the one or more boundary conditions to determine a match only when there is the match of the one or more external parameters and the one or more boundary conditions.

9. The method of claim 8, wherein the one or more external parameters comprise at least one of GPS data, weather data, or mapping data.

10. The method of claim 1, wherein the one or more boundary conditions of the at least one agricultural list of questions are correlated to a specific input routine; and wherein the query tool checks the one or more boundary conditions and the one or more agricultural process parameters for a match only responsive to the user executes the specific input routine correlated to the at least one agricultural list of questions.

11. The method of claim 1, wherein the at least one agricultural list of questions comprises screening data indictive of location; and wherein, only responsive to GPS data associated with the user matching the screening data indictive of location, the query tool determines whether the one or more agricultural process parameters match with the one or more boundary conditions.

12. The method of claim 1, further comprising:
defining, by another user, the at least one agricultural list of questions and the one or more boundary conditions;
aggregating, by the server platform, answers from a plurality of users to the at least one agricultural list of questions; and
providing, by the server platform, the aggregated answers to the another user.

13. The method of claim 1, wherein a trigger to presenting the user with the at least one question is responsive to determining that the agricultural process has been completed.

14. The method of claim 13, wherein the at least one question is generated in real time.

15. A server platform comprising:
at least one processor, wherein the at least one processor is configured to execute:
one or more input tools through which a user executes a process-related agricultural input routine;
a query tool linked to the one or more input tools; and
at least one memory;
wherein the input routine is configured to input one or more agricultural process parameters;
wherein the query tool, executed by the at least one processor, is configured to compare the one or more agricultural process parameters with one or more boundary conditions;

wherein the at least one memory comprises query data including at least one agricultural list of questions with the one or more boundary conditions associated therewith;

wherein the query tool, executed by the at least one processor, is configured to select, based on comparing the one or more agricultural process parameters with one or more boundary conditions, the at least one agricultural list of questions;

wherein the query tool, executed by the at least one processor, is configured to select at least one question from the at least one agricultural list of questions;

wherein the query tool, executed by the at least one processor, is configured to determine, based on analyzing at least one aspect of the agricultural process in real time, whether the agricultural process is being performed as the agricultural process is being performed or has been completed in real time upon completion; and wherein the query tool, executed by the at least one processor, is configured to, responsive to determining in real time that the agricultural process is being performed or has been completed, cause soliciting of input by querying the at least one question in order for the user to answer the at least one question so that the user is presented with the at least one question while the agricultural process is being performed or responsive to completing the agricultural process.

16. The server platform of claim 15, wherein the input routine is configured to process an adaptive process questionnaire;

wherein the adaptive process questionnaire comprises one or more predetermined questions that document an agricultural process or plan the agricultural process; and wherein the one or more predetermined questions are displayed to the user sequentially, with at least one of the one or more predetermined questions being displayed by the one or more input tools based one or more answers provided by the user to a preceding one of the one or more predetermined questions.

17. The server platform of claim 16, wherein the input routine comprises a first input step and a second input step as parts of the adaptive process questionnaire in which the user provides the one or more agricultural process parameters;

wherein the query tool is configured to check the one or more agricultural process parameters from the first input step with the one or more boundary conditions for a match; and wherein responsive to the query tool determining that there is the match of the one or more agricultural process parameters from the first input step with the one or more boundary conditions, the query tool is configured to offer the user the at least one question from the at least one agricultural list of questions to be answered in the second input step.

18. The server platform of claim 17, wherein the user provides an answer to the at least one question in the second input step; and wherein dependent on the answer to the at least one question in the second input step, the query tool is configured to present another question from the at least one agricultural list of questions in a subsequent input step.

19. The server platform of claim 15, wherein the query tool is configured to trigger presenting to the user the at least one question responsive to determining that the agricultural process has been completed.

20. The server platform of claim 19, wherein the query tool is configured to generate the at least one question in real time.

* * * * *